US007923681B2

(12) United States Patent
Collings et al.

(10) Patent No.: US 7,923,681 B2
(45) Date of Patent: Apr. 12, 2011

(54) COLLISION CELL FOR MASS SPECTROMETER

(75) Inventors: Bruce A. Collings, Bradford (CA); Mircea Guna, Toronto (CA)

(73) Assignee: DH Technologies Pte. Ltd., Singapore (SG)

( * ) Notice: Subject to any disclaimer, the term of this patent is extended or adjusted under 35 U.S.C. 154(b) by 158 days.

(21) Appl. No.: 12/232,618

(22) Filed: Sep. 19, 2008

(65) Prior Publication Data

US 2009/0095898 A1 Apr. 16, 2009

Related U.S. Application Data

(60) Provisional application No. 60/973,547, filed on Sep. 19, 2007.

(51) Int. Cl.
*B01D 59/44* (2006.01)

(52) U.S. Cl. ........ 250/282; 250/281; 250/283; 250/288; 250/292

(58) Field of Classification Search .................. 250/281, 250/282, 283, 288, 292
See application file for complete search history.

(56) References Cited

U.S. PATENT DOCUMENTS 5,248,875 A 9/1993 Douglas et al.
6,576,897 B1 * 6/2003 Steiner et al. ................. 250/292
6,674,069 B1 1/2004 Martin et al.
6,891,157 B2 * 5/2005 Bateman et al. .............. 250/292
7,034,292 B1 * 4/2006 Whitehouse et al. ......... 250/289
7,459,678 B2 * 12/2008 Schoen ......................... 250/292
7,498,571 B2 * 3/2009 Makarov et al. .............. 250/292

FOREIGN PATENT DOCUMENTS

EP 0237259 9/1987

OTHER PUBLICATIONS

Syka, Schoen and Ceja Proceedings of the 34th American Society of Mass Spectrometry ("ASMS") Conference Mass Spectrom. Allied Top., Cincinnati, OH, 1986, p. 718-719.
H.J. Dehmelt, Advances in Atomic and Molecular Physics, vol. 3, 1968, p. 53-72.
LC/MS, Varian 1200L, Quadrupole MS/MS.
Collings, Stott and Londry, Resonant Excitation in a Low-Pressure Linear Ion Trap, Journal of American Society of Mass Spectrometry, 2003, p. 622-634.
T. Covey and D.J. Douglas, Collision Cross Sections for Protein Ions, Journal of American Society of Mass Spectrometry, 1993, 4, 616-623.

* cited by examiner

*Primary Examiner* — Robert Kim
*Assistant Examiner* — Michael Maskell

(57) ABSTRACT

A novel curved collision cell for a mass spectrometer is described. The collision cell includes a straight section having a length that is selected to cause a precursor ion entering the straight section to lose a desired amount of kinetic energy such that when the precursor ion enters the curved section of the collision cell the precursor ion will tend to neither escape nor contact the collision cell, and thereby tending to survive its passage within the curved portion.

10 Claims, 15 Drawing Sheets

| Q3 m/z | Ion condition |
|---|---|
| 514 | 10 survived<br>0 crashed |
| 397 | 10 survived<br>0 crashed |
| 265 | 9 survived<br>1 crashed |
| 132 | 3 survived<br>7 crashed |
| 80 | 0 survived<br>10 crashed |

4 cm straight section, 180 degree curved Q2, Sx model, radius of curvature = 10.79 $r_0$, Q2=0.55 Q3, 10 mTorr $N_2$

| Q3 m/z | Ion condition |
|---|---|
| 514 | 10 survived<br>0 crashed |
| 397 | 10 survived<br>0 crashed |
| 265 | 10 survived<br>0 crashed |
| 132 | 9 survived<br>1 crashed |
| 80 | 4 survived<br>6 crashed |

Curved Q2 514 amu.jnb
Dec. 20/05
Book 15. p.103

COLLISION CELL FOR MASS SPECTROMETER

The present application claims the benefit of U.S. Provisional Patent Application No. 60/973,547, filed Sep. 19, 2007, the contents of which are incorporated herein by reference.

The section headings used herein are intended as organizational aids, and are not to be construed as limiting the subject matter of the teachings in any way.

FIELD

Teachings herein relate generally to mass spectrometry, and to novel collisions cells for mass spectrometers.

INTRODUCTION

In mass spectrometry, two mass analyzers can be used in series separated by a collision cell. In a collision cell, precursor ions are fragmented by collision-induced dissociation, to produce a number of product ions. Alternatively, the precursor ions may undergo reactions in the collision gas to form adducts or other reaction products. The term "product ion" is intended to mean any of the ion products of the collisions between the precursor ions and the gas molecules in the collision cell. The product ions (and remaining precursor ions) from the collision cell then travel into the second mass analyzer, which is scanned to produce a mass spectrum, usually of the product ions. Exemplary embodiments of straight collision cells can be found in U.S. Pat. No. 5,248,875 to Douglas et. al, the contents of which are incorporated herein by reference.

Exemplary embodiments of curved collision cells can be found in, for example, Syka, Schoen and Ceja, Proceedings Of the 34th American Society for Mass Spectrometry ("ASMS") Conference Mass Spectrom. Allied Top., Cincinnati, Ohio, 1986, p. 718-719, incorporated herein by reference. A reason for the use of curved collision cells is to reduce the overall length of the ion path within the mass spectrometer. An example of a curved collision cell is the 1200L Quadropole LC/MS sold by Varian, Inc. 3120 Hansen Way, Palo Alto, Calif. 94304-1030 USA.

Ions entering a gas filled collision cell incorporating curved quadrupoles for radial confinement of the ions, typically must do so at kinetic energies that will allow the ions to remain confined within the radial trapping potentials of the quadrupole. If the kinetic energy of the ion perpendicular to the axial axis of the quadrupole is higher than the pseudo-potential well depth, it is possible for the ion to be lost on a quadrupole electrode. Those skilled in the relevant arts will appreciate that the loss of ions can result in reduced sensitivity and other detriments in mass analysis. It can therefore be desirable to reduce and/or substantially eliminate such losses.

SUMMARY

In various aspects the applicants' teachings provide collision cells for mass spectrometers, the collision cells comprising both straight and curved sections.

In further aspects the applicants' teachings provide mass spectrometers comprising such collision cells.

In various embodiments, for example, collision cells according to applicants' teachings comprise straight sections having inlets for receiving precursor ions, the straight sections being of lengths selected in order to allow the precursor ions to lose enough kinetic energy, as they pass through the straight sections, to allow the precursor ions to travel through the curved sections without either escaping the collision cell or colliding with the collision cell.

In further aspects, the applicants' teachings comprise methods of designing, fabricating, and operating such collision cells and mass spectrometers, and methods of conducting mass analyses of ions using such collision cells.

BRIEF DESCRIPTION OF THE DRAWINGS

Those skilled in the relevant arts will understand that the drawings, described below, are for illustration purposes only. The drawings are not intended to limit the scope of the applicants' teachings in any way.

DETAILED DESCRIPTION OF EXAMPLE EMBODIMENTS

It should be understood that the phrase "a" or "an" used in conjunction with the present teachings with reference to various elements encompasses "one or more" or "at least one" unless the context clearly indicates otherwise.

Figure 1:
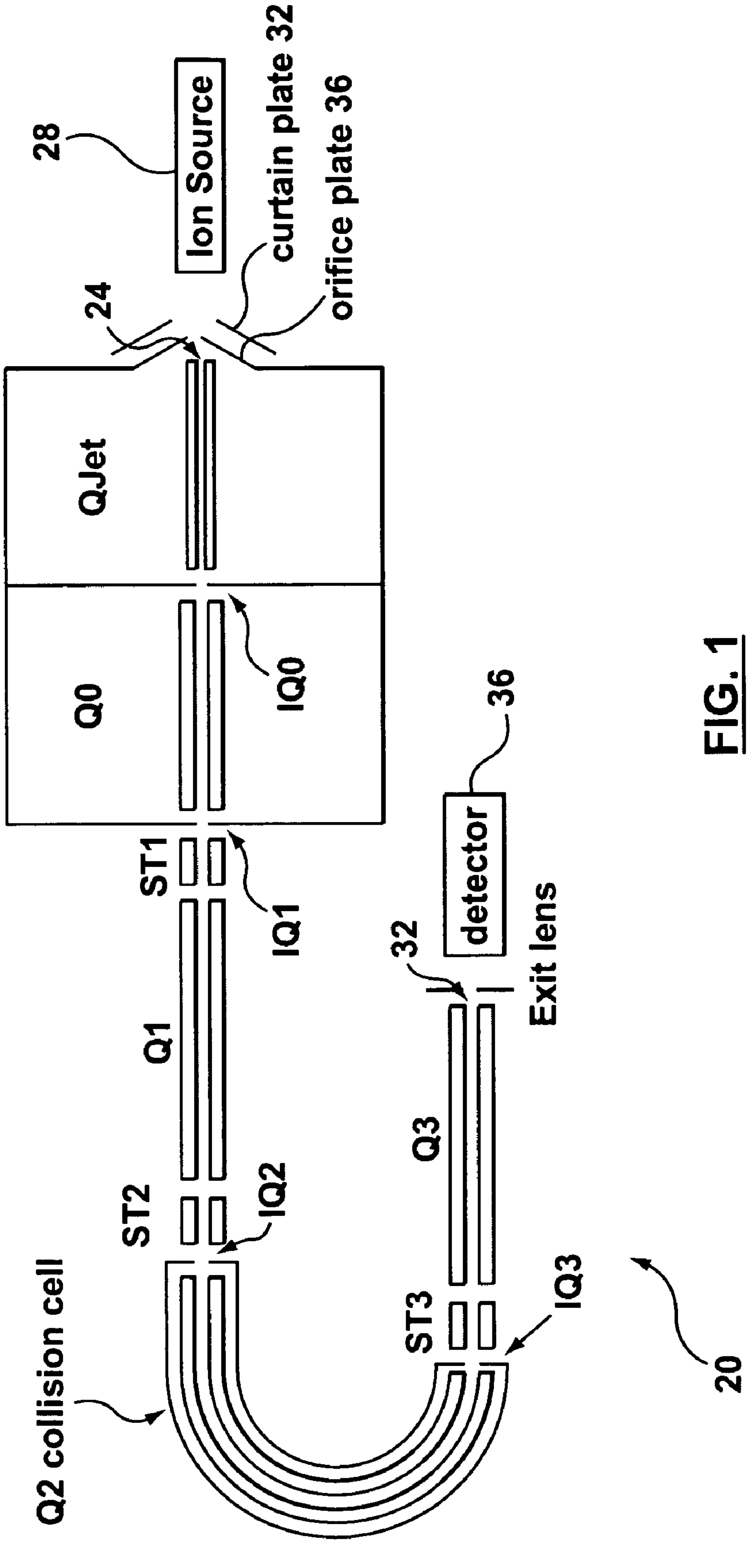
FIG. 1 is a schematic representation of a mass spectrometer in accordance with an embodiment of the applicants' teachings.

With reference to FIG. 1, a mass spectrometer ("MS") in accordance with applicants' teachings is indicated generally at 20. In the illustrated embodiment, MS 20 comprises a quadrupole region QJet (a trademark of Applied Biosystems/MDS Sciex) that includes an opening 24 operable to receive from an ion source 28 sample precursor ions. In the illustrated embodiment, opening 24 is characterized by a curtain plate 32 and an orifice plate 36. In a present embodiment, region QJet operates at a pressure of about two to about four Torr.

In the embodiment shown in FIG. 1, MS 20 also comprises a collision focusing ion guide region Q0 adjacent to region QJet which receives precursor ions from region QJet via an aperture IQ0, and which expels those ions via aperture IQ1. In a present embodiment, region Q0 operates at a pressure of about five milliTorr to about ten milliTorr.

In the embodiment shown in FIG. 1, MS 20 also comprises a first stubby RF-only ion guide ST1 which serves as a Brubaker lens, a first ion guide region Q1, and a second stubby ST2. First stubby ST1 is adjacent to aperture IQ1 and receives precursor ions that exit from region Q0. In turn, the precursor ions in first stubby ST1 travel through first stubby ST1, first ion guide region Q1, and second stubby ST2.

In the embodiment shown, MS 20 also comprises a J-shaped curved collision cell Q2. Curved collision cell Q2 comprises a straight section or portion 40, a curved section or portion 4, and inlet aperture IQ2 to receive precursor ions from second stubby ST2, and an outlet aperture IQ3 through which to release ions, including product ions that are generated from precursor ions during their passage through region Q2. Second ion guide region Q2 is described in greater detail below.

In the embodiment shown, MS 20 also comprises a third stubby ST2, a third ion guide region Q3, an exit lens 32 and a detector 36. Third stubby ST3 is adjacent to aperture IQ3 and receives ions from region Q2. In turn, the ions in third stubby ST3 travel through third region Q3, and into detector 36 via lens 32.

Those skilled in the relevant arts will appreciate that suitable structures and methods of operation of portions of MS 20 other than region Q2 are known, and that the exact configuration(s) thereof are not particularly limited. Accordingly, further discussion of those portions and their operations will be limited to correspond to discussions regarding region Q2. Those skilled in the relevant arts will further appreciate that many types and configurations of mass spectrometers suitable for use with curved collision cells according to the teachings herein are available, and will doubtless hereafter be developed. Typical ion guides of ion guide regions Q0, Q1, Q2 and Q3 and stubbies ST1, ST2 and ST3 in the present teachings, can include at least one electrode as generally known in the art, in addition to ancillary components generally required for structural support. In various embodiments, for example, the electrodes can be configured as rod sets of four (quadrupole), six (hexapole), eight (octapole), or higher multiple rods, or as sets of multiple rings, and the collision cell(s) can be configured with an outer casing or shell to aid in containing collision gas(ses).

Figure 2:
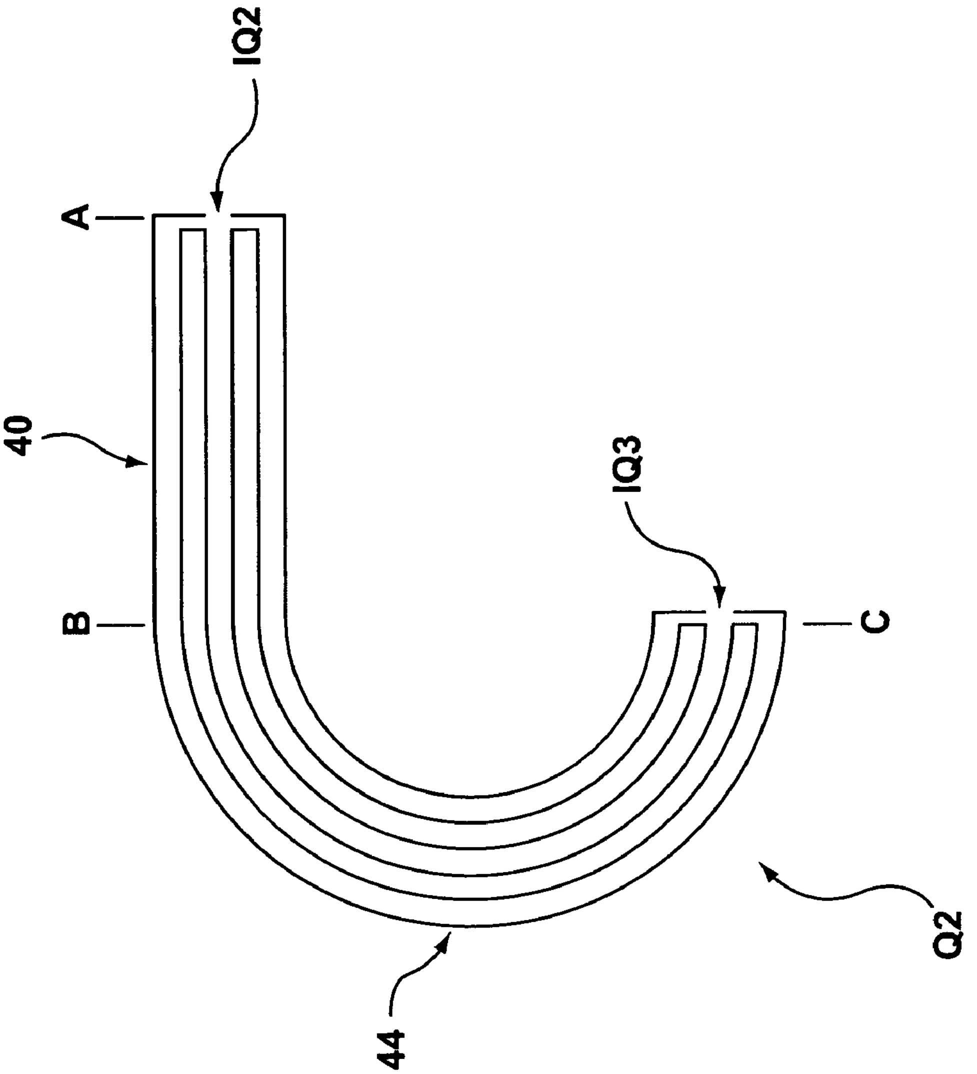
FIG. 2 shows the collision cell region Q2 from FIG. 1 in greater detail.

Referring now to FIG. 2, curved collision cell Q2 is shown in greater detail. Region Q2 comprises a generally linear, or straight, section 40 and a curved section 44. As shown in FIG. 2, linear section 40 lies between the lines indicated at A and B, while curved section 44 lies between the lines indicated at B and C. In operation, it is in many circumstances advantageous to provide within region Q2 a collision gas, as for example nitrogen, having a specific mass of 28 Da, which may be dispersed throughout region Q2. The use of collision gases in mass spectrometers, the conditions under which their use is advantageous, and various types of collision gas are well understood by those skilled in the relevant arts.

In a present embodiment, a desirable length A-B of straight section 40 can be determined using the following parameters:

a) the kinetic energy of precursor ions as they enter region Q2 via aperture IQ2;
b) temperature and pressure within region Q2;
c) specific mass and other characteristics of the collision gas within region Q2;
d) amount of internal energy required for the desired precursor ions to fragment and;
e) the radio-frequency ("RF") amplitude on voltages applied to ion guide in region Q2.

Figure 3:
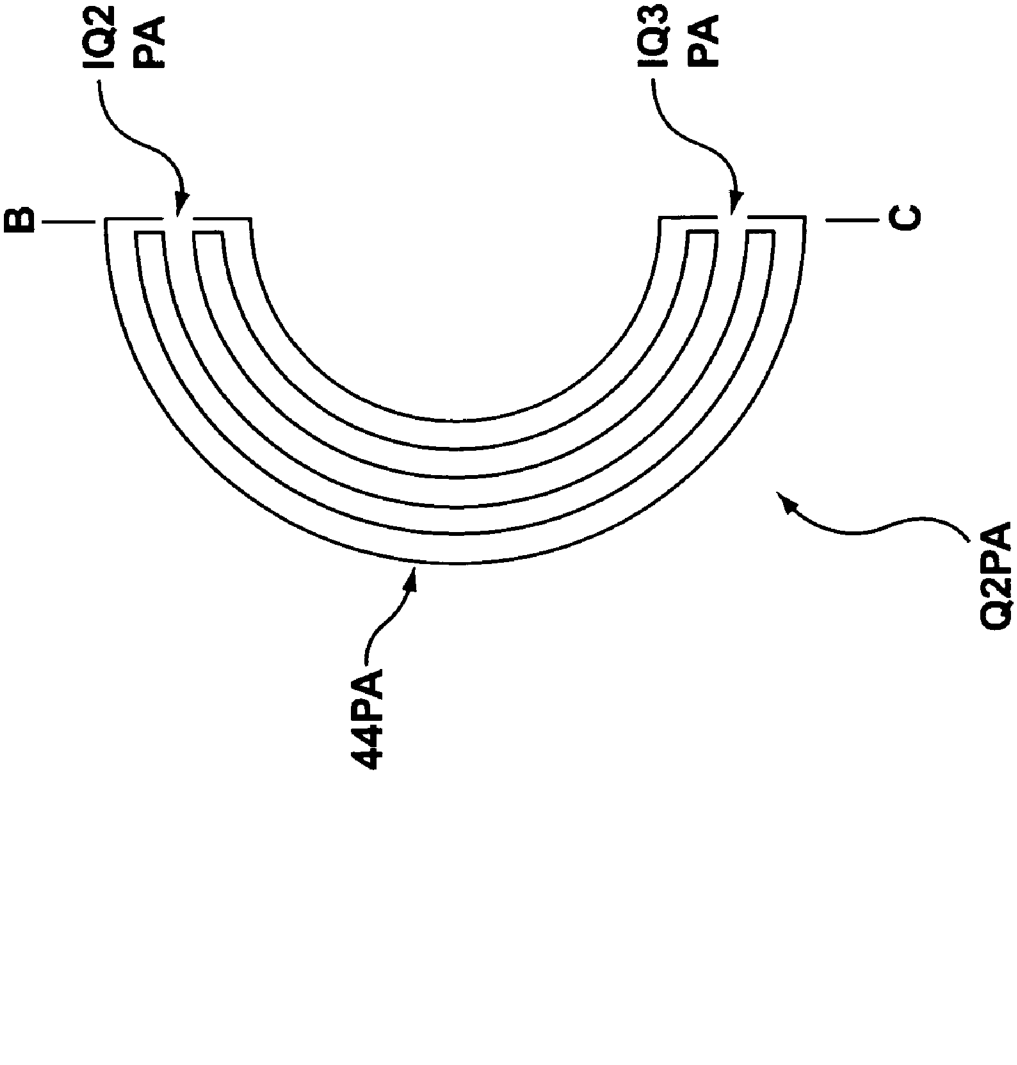
FIG. 3 (PRIOR ART)
FIG. 3 shows a prior art collision cell region Q2PA.

For comparison, a representation of a prior-art U-shaped collision cell, referred to as a second ion guide region Q2PA, is shown in FIG. 3. Ion guide region Q2PA shares much of the structure of ion guide region Q2, and thus elements in ion guide region Q2PA that correspond with elements in ion guide region Q2 bear the same reference characters, except followed by the suffix "PA" to denote "Prior Art". Persons skilled in the art will thus recognize that ion guide region Q2PA is substantially the same as ion guide region Q2, except that ion guide region Q2PA does not include any straight section that corresponds to linear section 40 in ion guide region Q2. A representative example of ion guide region Q2PA is incorporated in the 1200L Quadrupole LC/MS system available commercially through Varian, Inc., of Palo Alto, Calif.

The inventors have determined that linear section 40 provides heretofore unknown and unexpected improvements to the art. In so determining, the inventors applied a model that can be used to calculate the amount of kinetic energy that an ion has as a function of axial distance and pressure in a curved collision cell. The energy loss model of Covey and Douglas (JASMS 1993,4, 616-623) is an example of a relationship that can be used to describe the kinetic energy of a precursor ion. In this model the kinetic energy, E, of an ion can be found using Equation 1:

$$E = E_0 \exp(-\sigma S \ln(\alpha')) \text{ where } S = nl \text{ and } \alpha' = \frac{(m_1 + m_2)^2}{m_1^2 + m_2^2} \tag{1}$$

In Equation 1:
n is the collision gas density,
l is the path length,
$\sigma$ is the collision cross section,
$m_1$ is the mass of the ion,
$m_2$ is the mass of the collision gas (typically nitrogen, 28 Da), and
$E_0$ is the initial kinetic energy of the ion.

In order for the ion to be confined within a region Q2, Q2PA, it is necessary that the ion's kinetic energy perpendicular to the ion guide axis be less than the psuedopotential well depth.

The pseudo-potential well depth is the time averaged potential for the RF radial confinement fields of the ion guide within region Q2, Q2PA. The pseudo-potential well depth can be calculated using for example Equation 2 (see H. G. Dehrnelt, Adv. *Atom. Mol. Phys.* 3, 53-72 (1967)):

$$\overline{D_n} = \frac{q_u}{4} V_{rf} \tag{2}$$

where $V_{rf}$ is the RF voltage amplitude (zero to peak, pole to ground) and $q_u$ is the Mathieu parameter defined by Equation 3:

$$q_u = \frac{4eV_{rf}}{mr_0^2\Omega^2} \tag{3}$$

Where $r_0$ is the mean radius of the ion path 46, 120 in the curved collision cell Q2, Q2PA, and $\Omega$ is the RF voltage frequency.

Figure 4:
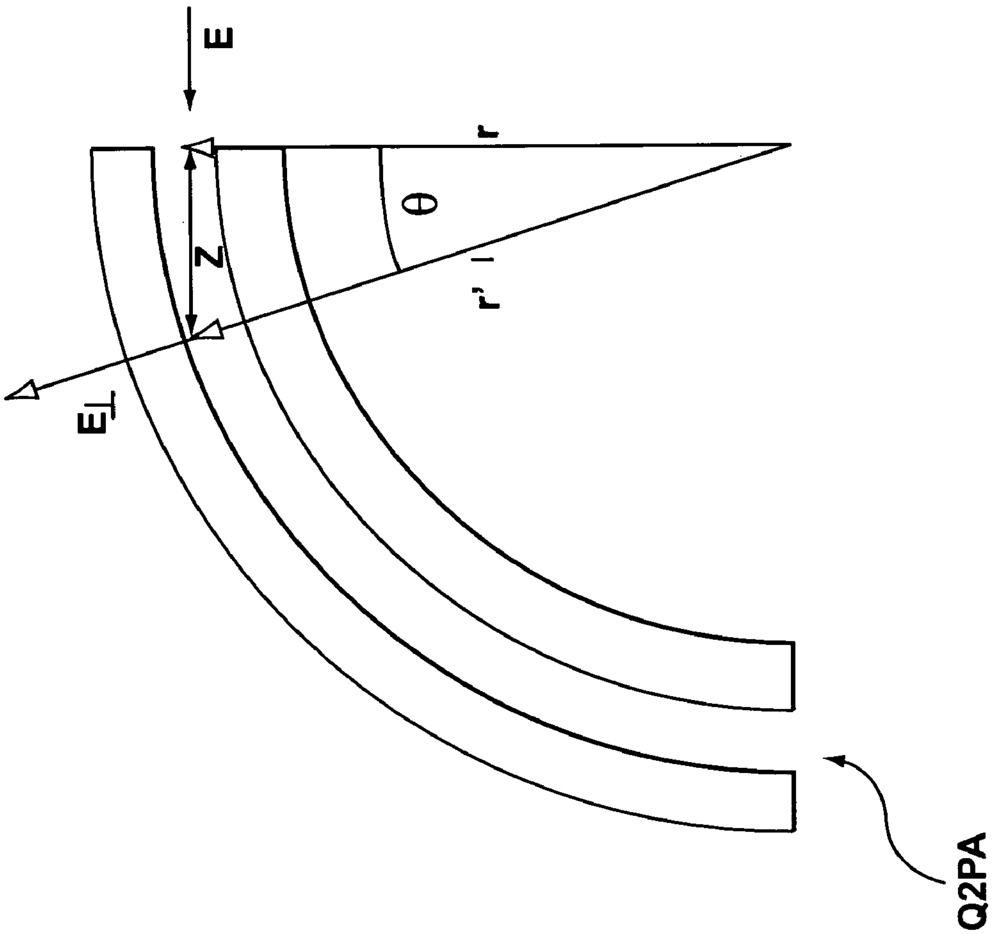
FIG. 4 (PRIOR ART)
FIG. 4 shows a portion of prior art collision cell region Q2PA in greater detail.

A parameter of interest is the kinetic energy E of the ion perpendicular to the axis of the ion guide. With respect to geometries, operating conditions, and analyses commonly applied in multi-ion guide mass spectrometers such as the triple quadrupole API 4000 LC/MS/MS System (API 4000 is a trademark of Applied Biosystems/MDS Sciex), a point at which this can become a problem in a curved collision cell such as Q2, Q2PA is demonstrated in FIG. 4, where the ion path of curved section 44 is about fifteen cm long and region Q2, Q2PA is curved at about 90°. (Note FIG. 4 is not to scale). Referring to FIG. 4, at a distance Z mm into the curved section shown in FIG. 4, the ions will strike the outer rod 48 if the amount of kinetic energy perpendicular to the ion guide longitudinal axis 120 (E⊥) is sufficient to overcome the trapping potential of the ion guide.

For a Q2 section curved at 180° and about fifteen centimeters (cm) in length, for the geometry shown in FIG. 4, r=47.746 millimeters (mm) and r'=51.917 mm, giving z=20.4 mm (and Θ=23.1°). Thus, Z is the distance that an ion starting on the ion guide longitudinal axis 46, 120, at the beginning of the curved section 44PA, can travel in a straight line until it hits an electrode. At this distance and angle: E⊥=0.392*E. (i.e. E⊥=sin (Θ)*E).

As an example, the trapping potential for the ion reserpine (mass/charge (m/z)=609.2, σ=280 $Å^2$) at $q_u$=0.2824 on region Q2, Q2PA (corresponding to m/z (Q3)=609.2 with the ratio $q_u$(Q2PA)=0.4$q_u$(Q3)), F=816 kHz, $r_o$=4.171 mm and $V_n$=203.8 V, is 14.4 eV. A precursor ion will have to lose enough kinetic energy such that E⊥, will be less than about 14.4 eV in order to prevent the precursor ion from hitting the electrode or escaping.

Figure 5:
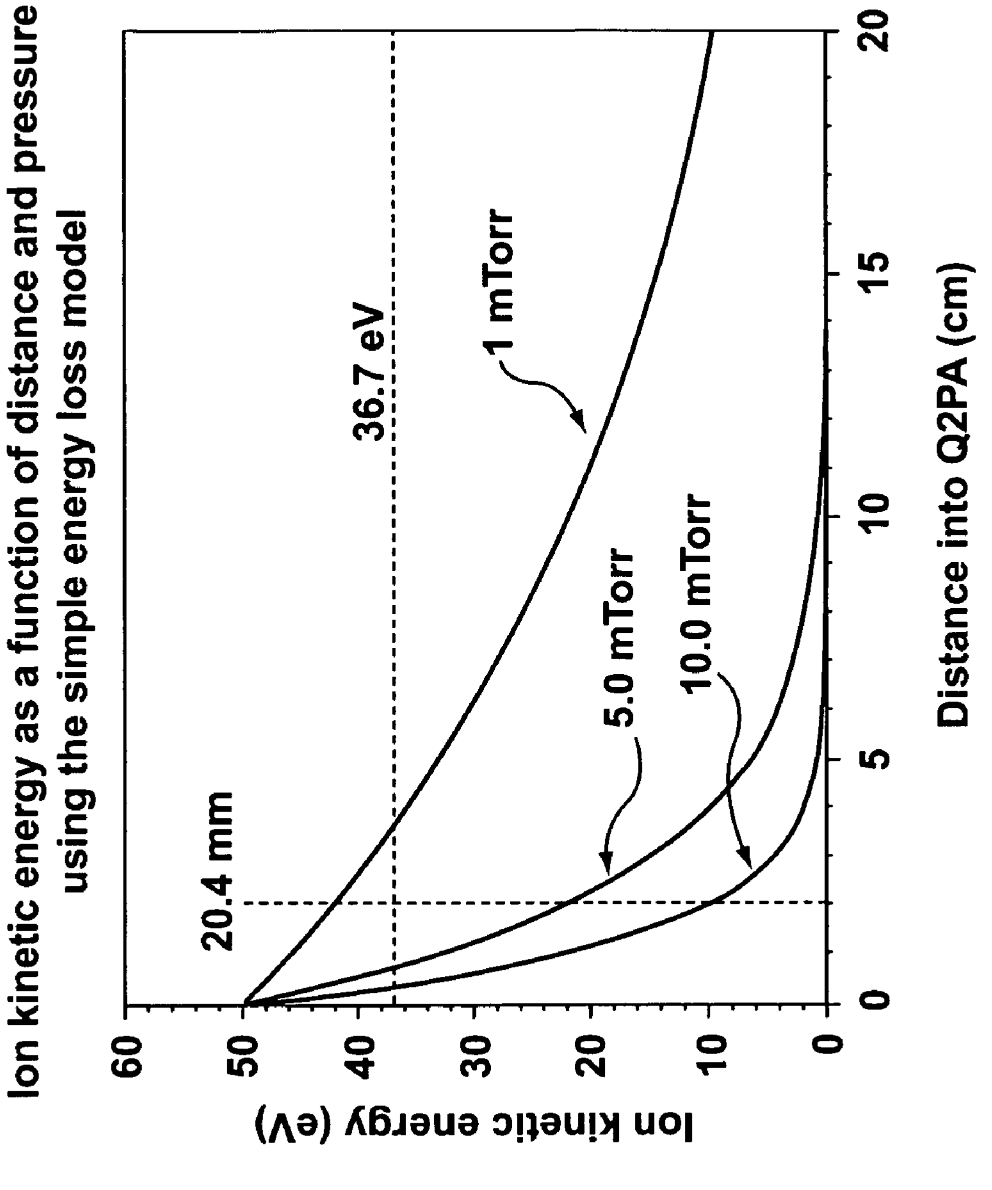
FIG. 5 is a graph of ion kinetic energy as a function of distance and pressure using a simple energy loss model.

FIG. 5 shows the kinetic energy of an ion having a mass-to-charge ratio (m/z) of 609.2, e.g., for a reserpine ion, as a function of distance into nitrogen at three different pressures. If the ion travels in a straight line and has enough kinetic energy to pass through the radial confinement barrier then it will collide with an ion guide electrode, or other ancillary components of the collision cell, at a minimum distance of about 20.4 mm from the entrance of the curve.

In order to pass through the barrier the ion will require a kinetic energy of more than about 36.7 eV in the Z direction corresponding to E⊥=14.4 eV. FIG. 5 shows that a reserpine ion injected into the region Q2 at a kinetic energy of about 50 eV will lose enough energy to not collide with (that is, to be "trapped" by) a ion guide rod at about 5.0 and about 10.0 mTorr of nitrogen. However, at about 1.0 mtorr the ion has enough energy to overcome the radial confinement barrier and collides with an ion guide electrode, or other ancillary components of the collision cell.

It should also be noted that the trapping potential on an ion guide of region Q2, Q2PA during an MS/MS experiment varies as a function of the region Q3 mass resolution configuration. This is because on a prior art triple quadrupole mass spectrometer (i.e. where region Q2PA is used within MS 20 in place of region Q2), the RF amplitude is derived from the Q3 mass analyzing quadrupole. When the foregoing is performed on the API 4000 (a known prior art triple quadrupole mass spectrometer which has a similar structure of MS 20 with the exception that region Q2 consists entirely of a linear collision cell, hereafter denoted as Q2PAL) the ratio for $q_u$(Q2PAL)/$q_u$(Q3) is about 0.4. For example, if Q1 is operating in a mass-analyzing mode, and allows precursor ions of only 609 m/z to pass, then the precursor ions can enter Q2PAL with an average kinetic energy of 50 eV. In Q2PAL, the precursor ions can be expected to collide with the collision gas and can fragment to produce product ions, for example, of 448 m/z, 397 m/z, 195 m/z, etc., which pass through Q3. When Q3 operates in a mass-analyzing mode, it can scan from low to high mass (for example, from 150-650 m/z).

Substantially all fragments of 609 m/z produced in the Q2PAL cell can be expected to pass into the Q3 analyzing quadrupole, which transmits (that is, allows to pass) only those masses as determined by the particular combination of RF amplitude and resolving direct current (DC) voltage. Q2PAL sections may be capacitatively linked to Q3, so that the RF amplitude of voltages applied to Q2 tracks with those applied to Q3. When the foregoing is performed on an API 4000 system, the ratio for $q_u$(Q2PAL)/$q_u$(Q3) is about 0.4.

However, in the present embodiment where MS 20 is configured as shown in FIG. 1, $q_u$(Q2)/$q_u$(Q3) has advantageously been increased to about 0.6. It should also be realized that while the region Q3 mass analyzing quadrupole is scanned with mass, the Q1 mass analyzing quadrupole remains fixed at the precursor ion mass. This means that the RF amplitude on region Q2 is not a constant fraction of the region Q1 RF amplitude and that the trapping potential for the precursor ion in region Q2 varies as a function of the Q3 mass resolution setting, i.e., that it varies as a function of the RF amplitude present on Q3.

Figure 6:
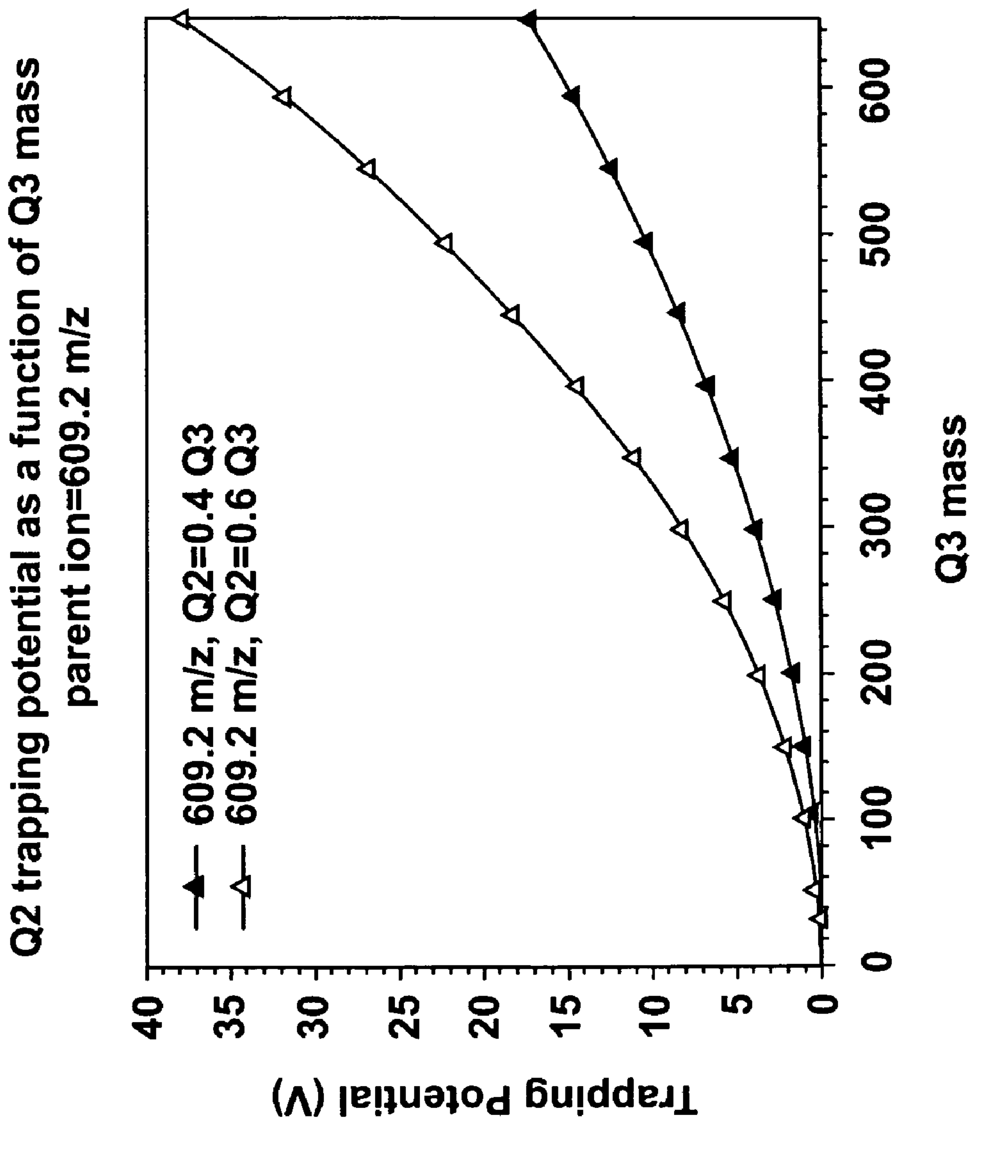
FIG. 6 is a graph of Q2 trapping potential as a function of Q3 mass.

FIG. 6 shows this for the precursor ion reserpine (m/z=609.2) for both $q_u$(Q2)≈0.4$q_u$(Q3) and $q_u$(Q2)≈0.6$q_u$(Q3). The radial trapping potential increases with the square of the Q3 RF amplitude as the Q3 mass is increased. As is known to those skilled in the relevant arts, in quadrupole mass analyzers the masses transmitted are a function of the RF and DC potentials applied to the four rod electrodes (2 poles of 2 rods each). Scaling the RF and DC potentials appropriately can cause ions of greater mass to be transmitted.

The above calculations show that if an ion is to survive injection into a curved collision cell (such as region Q2PA, or curved section 44 of region Q2) then the ion must either not possess too much kinetic energy or the collision cell pressure must not be too low. Increasing the collision cell pressure is one method of reducing the ions' kinetic energy to an acceptable level. However, ions with high activation energies may require a significant increase in cell pressure, which may lead to detrimental effects in the mass analyzing quadrupoles. One exemplary detrimental effect will be the increase in pressure in the mass analyzing vacuum chamber. This could lead to operation of the ion detector in less than optimal conditions. Other detrimental effects can include loss in sensitivity due to the scattering of ions, particularly with respect to lighter ions. Accordingly, pressures of collision gasses, where used, may be adjusted accordingly.

Provision of a straight section 40 with curved section 44 in a region Q2 can allow the ions to dissipate some kinetic energy prior to encountering curved section 44, and thereby increase the likelihood of ion survival within curved section 44.

In order to avoid discontinuities or other irregularities in potential fields applied within the curved collision cell, it can be advantageous to provide such cells, as shown in the various figures, with the straight and curved sections integrally formed from monolithic electrodes.

Simulations have been carried out using an ion trajectory simulator. The simulator modeled exemplary electrodes in three spatial dimensions. Trajectories for ion masses of the Taurocholic acid ion (m/z=514) were performed. Simulations were carried out for a region structured in the form of region Q2PA, and for a region structured in the form of region Q2.

Figure 7:
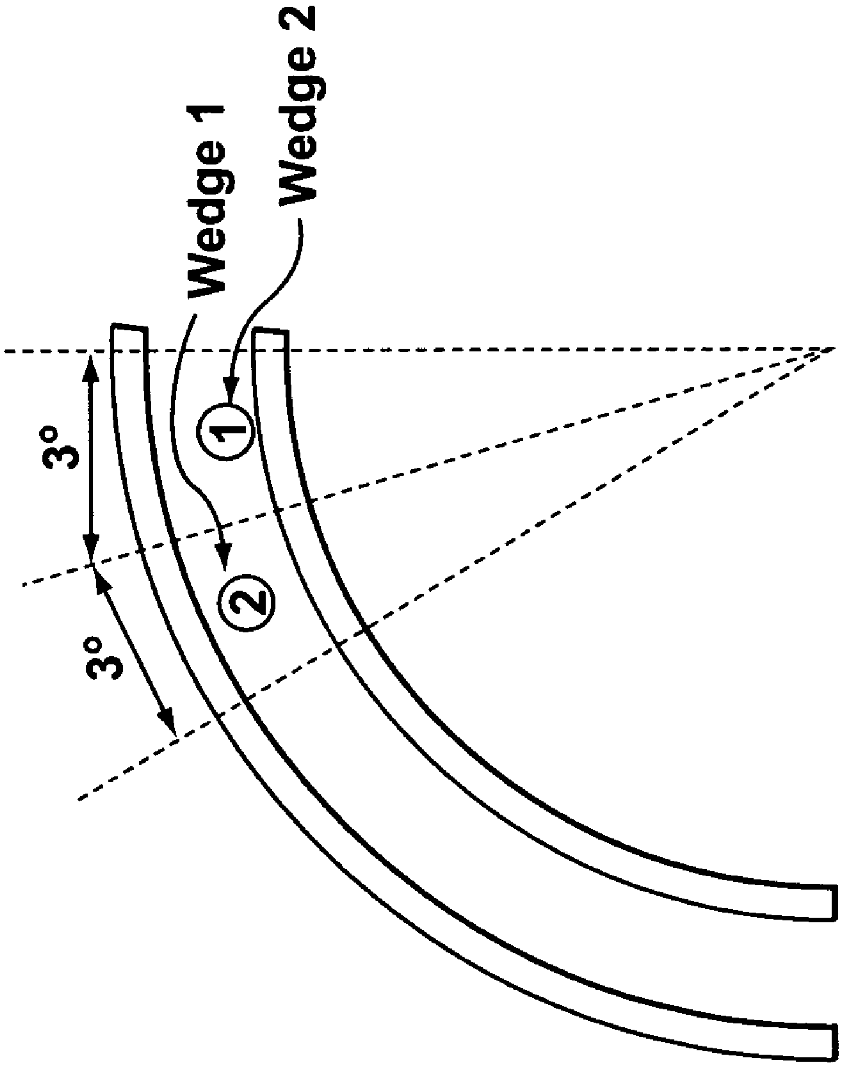
FIG. 7 is a diagram of an example of a "wedge".

For region Q2, straight section 40 was about four cm long. For region Q2 and Q2PA, the radius of curvature of curved section 44 and 44PA was about forty-five mm. Regions Q2 and Q2PA each comprised an A-pole and a B-pole, each with two electrodes for a total of four rods (quadrupole). The RF signal was 180 degrees out of phase between the A and B poles. Simulations were carried out at two different RF frequencies, 816 and 940 kHz. The initial ion energy was set at 100 eV, the pressure was 10 mTorr of nitrogen and the collision cross section was 225 $Å^2$. Taurocholic acid has a structure similar to that of reserpine, which has a measured collision cross-section of about 280 $Å^2$. Taurocholic acid is slightly smaller, so a reasonable collision cross-section for this ion would be expected to be on the order of 200 $Å^2$-250 $Å^2$. Ten trajectories were run for ions with the initial starting conditions for RF phase and position being randomly selected. A drift field of 10 V/m was also applied to simulate the effects of an axial gradient. The curved section of the collision cell was created by using a section of the electrodes defined within a 3-degree radius, or "wedge" or slice, of the electrodes, as shown in FIG. 7. An ion's final condition as it exited the 3-degree section was used as the initial starting conditions for the next 3-degree Section, as shown in FIG. 7. The simulations were continued until the ion either exited the curved section (i.e., escaped the collision cell), the trajectory was terminated upon an electrode (i.e., the ion collided with the electrode) or, in a few cases, the ion trajectory was stopped because the ion had lost enough kinetic energy that a collision with the collision gas knocked it out at the entrance of the wedge. The latter condition was simply an artifact of the simulator and implies that the ion kinetic energy is low enough that it could not collide with an electrode. In this case ions can be treated as having survived transmission through the curved section.

Figure 8:
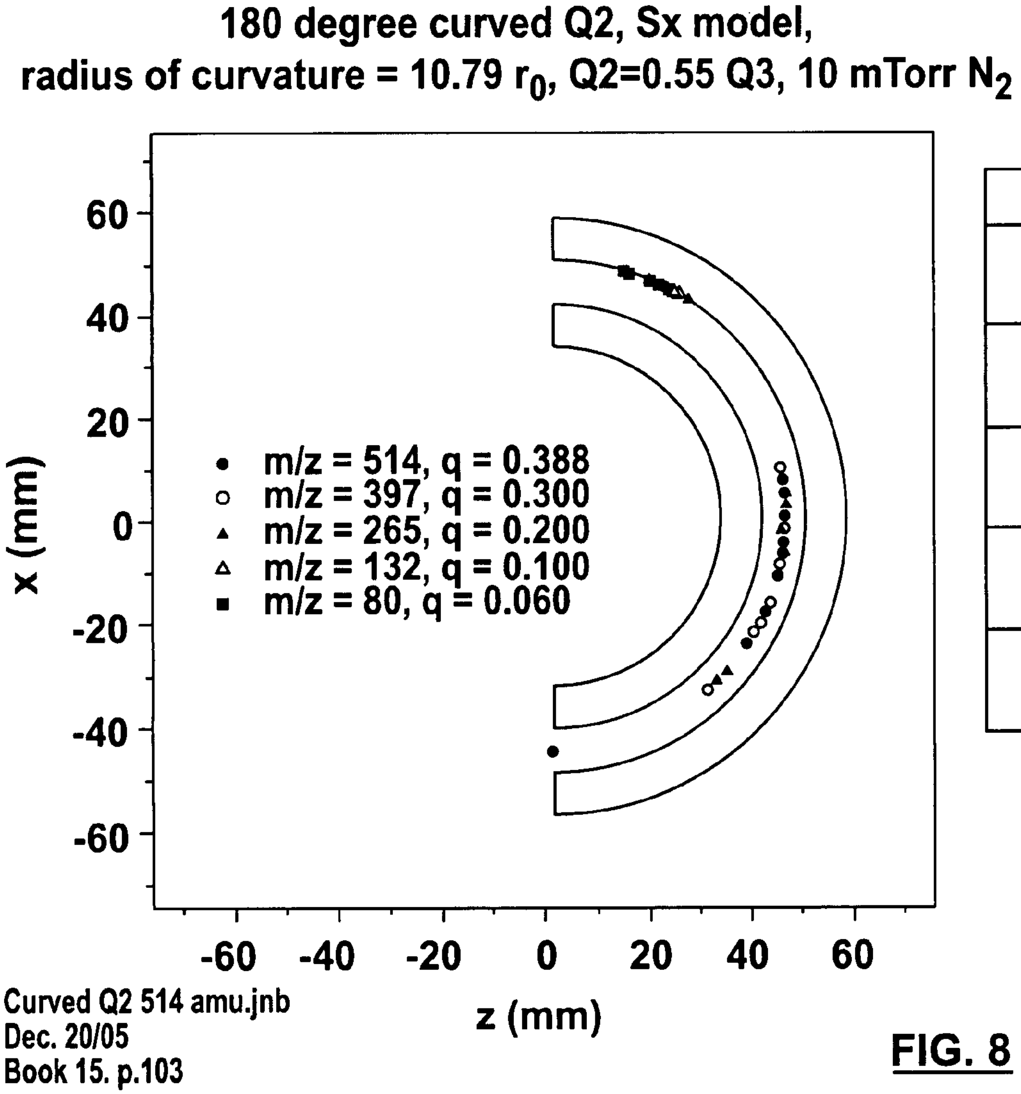
FIG. 8 is a graph showing results of certain simulations performed on region Q2PA.
Figure 9:
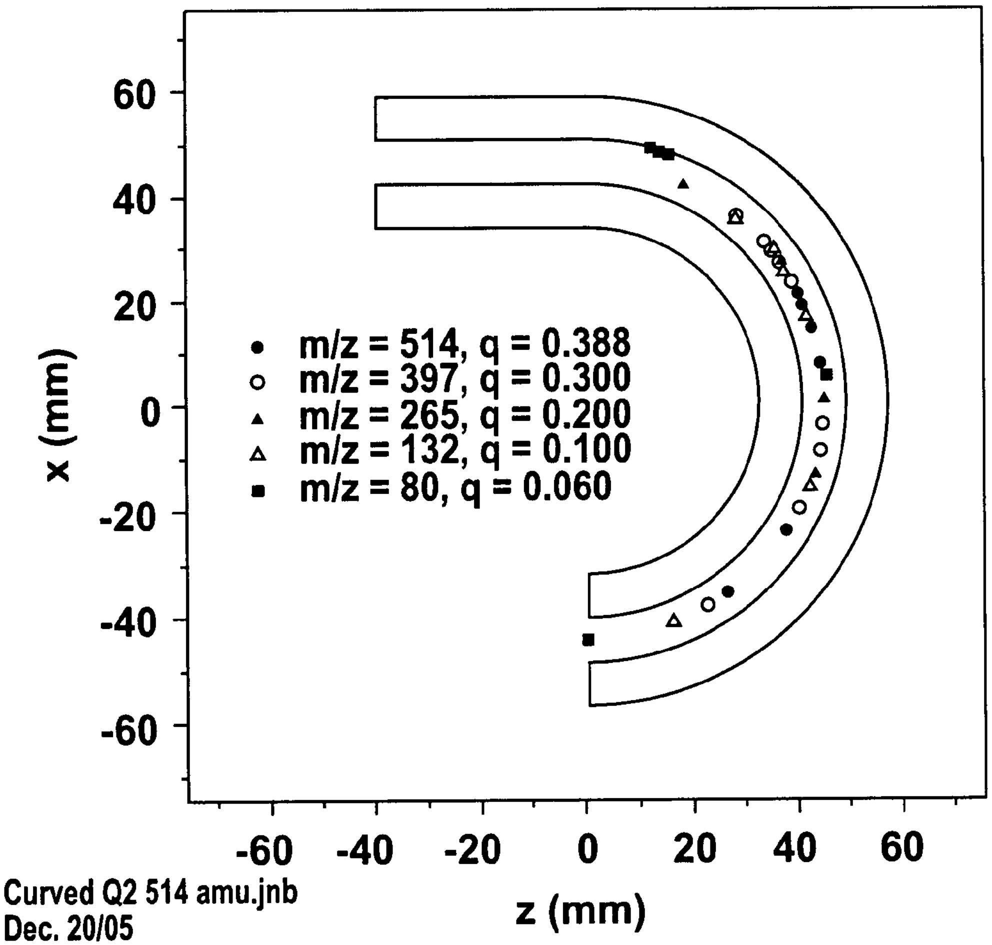
FIG. 9 is a graph showing results of certain simulations performed on region Q2.

FIG. 8 shows a diagram of region Q2PA and FIG. 9 shows a diagram of region Q2 as used in the simulation. The RF frequency was 940 kHz for the results of both simulations shown in FIGS. 8 and 9. The RF amplitude on Q2 and Q2PA was 55% of that applied to Q3. This simulates an actual RF amplitude ratio. This would place 514 m/z at $q_u$=0.388 when the ion was entering Q2 or Q2PA and Q3 was set to transmit 514 m/z. Recall that when Q3 is mass analyzing the ions are transmitted at $q_u$=0.706. When Q3 was set to transmit 80 m/z the $q_u$ value of the collision cell was 0.060 for 514 m/z whereas for 80 m/z the $q_u$ value would be 0.388.

In FIG. 8 the ion was injected into region Q2PA with 100 eV of kinetic energy and 10 mTorr of nitrogen. The results show that at the start, ten out of ten ions of 514 m/z survived transmission through the cell. In contrast, at an RF amplitude corresponding to the fragment 80 m/z all of the trajectories for 514 m/z terminated or 'crashed' upon an electrode near the entrance to region Q2PA. The entrance to region Q2PA is in the top half of the graph.

FIG. 9 shows the results of the simulations for a Q2 section comprising a four cm straight section 40 in addition to curved section 44. All other initial conditions were the same as in FIG. 8. The results show that there is an increase in the number of 514 m/z ions that survive transmission through region Q2 when the RF amplitude is set for the lower mass fragments. This means that the straight section 40 of section Q2 enabled ions of 514 m/z to lose enough kinetic energy to survive transmission through the cell when the RF amplitude was reduced to levels that were too low for successful transmission in region Q2PA.

Experiments were carried out on the molecule taurocholic acid. This molecule forms a negative ion with mass 514 m/z. A major fragment of taurocholic acid occurs at 80 m/z. As mentioned above, taurocholic acid has a structure similar to that of reserpine which has a measured collision cross-section of about 280 $Å^2$. Taurocholic acid is slightly smaller than reserpine, so a reasonable collision cross-section for this ion would be on the order of 200 $Å^2$ to about 250 $Å^2$. Ions of taurocholic acid are also difficult to fragment, requiring a collision energy of more than 90 eV for efficient fragmentation. The small size and the toughness of this ion are ideal to demonstrate the benefits of region Q2 in place of region Q2PA. The fraction of the RF amplitude on the Q2 collision cell was 55% of that applied to the Q3 mass analyzing quadrupole. This means that when Q3 is set to analyze 80 m/z the $q_u$ value on Q2 is 0.060 for 514 m/z and 0.388 for 80 m/z. It should also be noted in this experiment that curved section 44 of region Q2 had a radius of 50 mm at the longitudinal axis of the cell, while straight section 40 was of length 25 mm.

Figure 10:
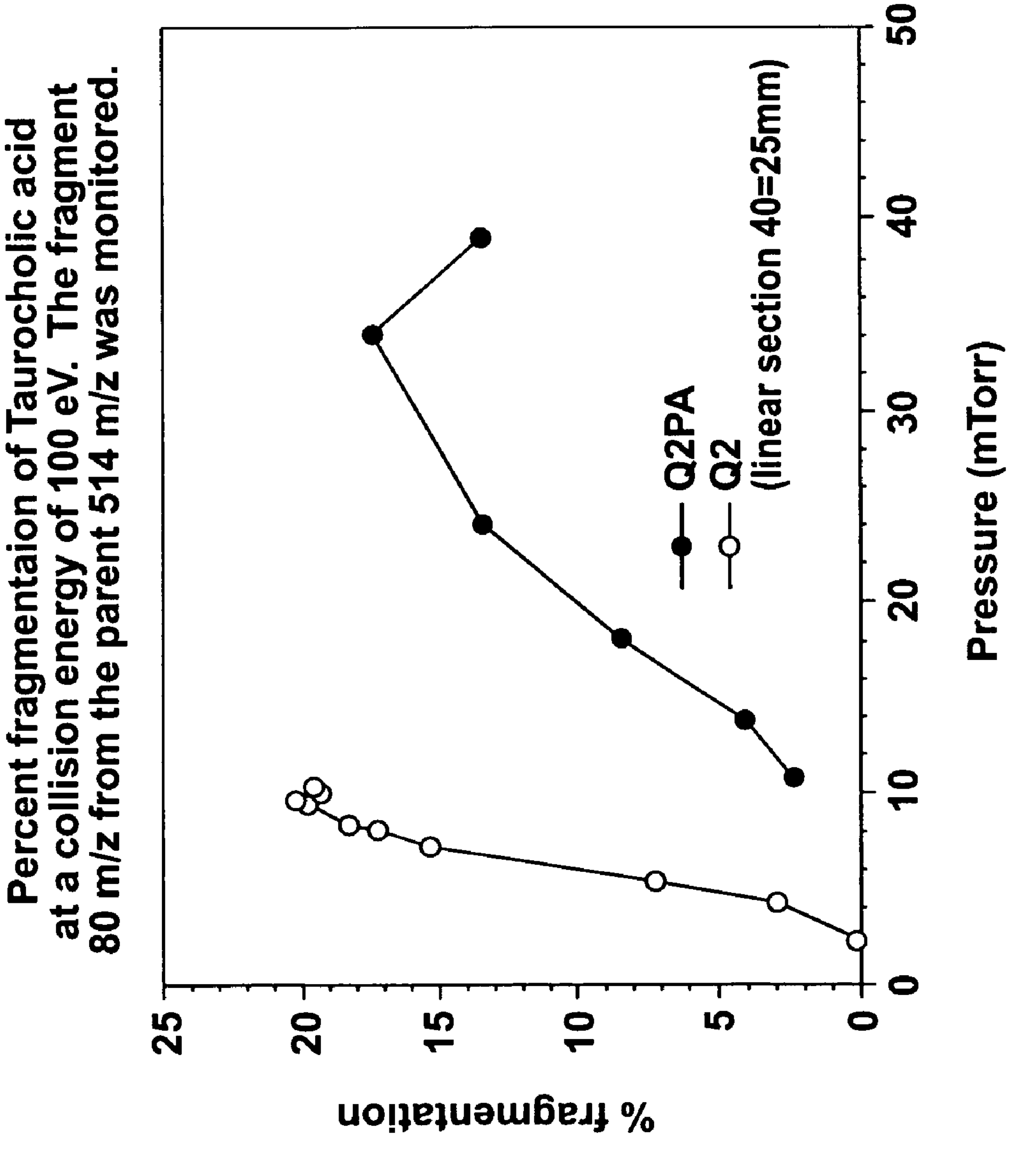
FIG. 10 is a graph showing results of certain experiments performed on region Q2 and region Q2PA.

The data shown in FIG. 10 were obtained on two different instruments. Region Q2PA (i.e. with curved section 44PA only) was operated at 816 kHz. In contrast, region Q2 included straight section 40 with a length of 25 mm and was operated at a frequency of 940 kHz. The fraction of RF amplitude on the collision cell relative to Q3 was 55% for both systems. It is clear that the data for the straight section plus curved collision cell is much more efficient at fragmenting taurocholic acid and transmitting the 80 m/z fragment. The effect of frequency can be realized by examining equations 2 and 3. The pseudo-potential well depth will be a factor of 0.754, $(816\ \text{kHz}/940\ \text{kHZ})^2$, for the 816 kHz instrument (i.e. Q2PA) compared to the 940 kHz instrument (i.e. Q2) at the same $q_u$ value.

FIG. 10 shows the percent fragmentation for the fragmentation of 514 m/z to 80 m/z. The percent fragmentation is defined as the intensity of the 80 m/z fragment at a collision energy of 100 eV divided by the intensity of the 514 m/z with no collision gas in the collision cell at an ion energy of 20 eV. In region Q2PA (i.e. without straight section 40 in front of the collision cell) the fragmentation efficiency maximizes at 34 mTorr of nitrogen in the gas cell. In region Q2 (i.e. with the 2.5 cm straight section 40) the maximum fragmentation efficiency occurs at a pressure of about 9.5 mTorr. A benefit of straight section 40 in region Q2 is the decreased collision cell pressure required for efficient fragmentation. Among advantages thus realized is a reduction in the pumping requirements for the high vacuum region maintained in Q1, Q3, and the detector, with a resultant reduction in scattering, etc., of ions. If a limitation on the maximum collision cell pressure is set to 10 mTorr then the gain in fragmentation efficiency would be a factor of 8.5 in the data of FIG. 10.

Figure 11:
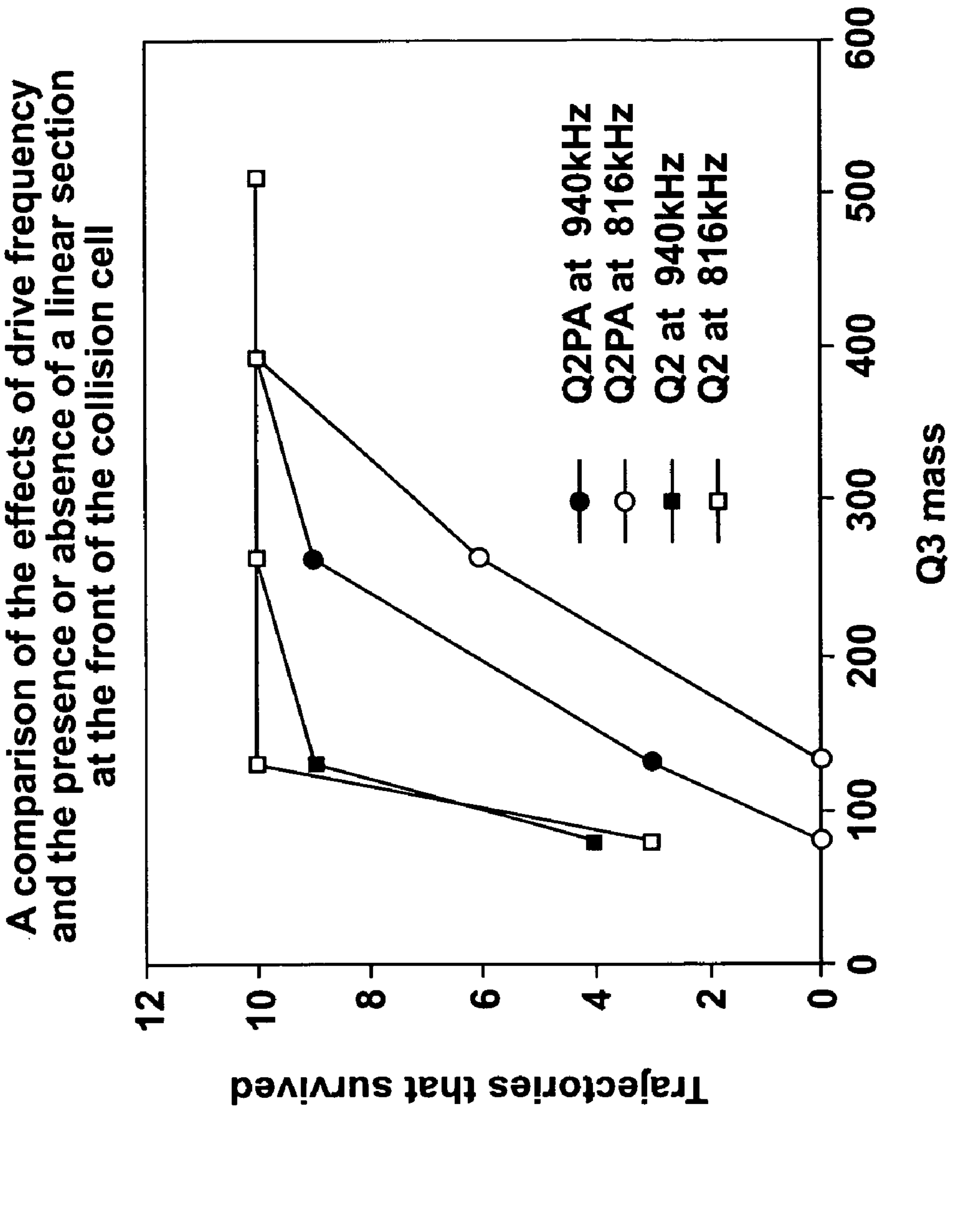
FIG. 11 is a graph showing effects of different drive frequencies on simulations performed on region Q2 and region Q2PA.

The increase in drive frequency from 816 to 940 kHz is beneficial for confinement of ions but can be considered a minor effect. This is shown, for example, by the simulation results of FIG. 11 where drive frequencies of 816 and 940 kHz were used for both Q2PA and Q2. FIG. 11 shows that the difference in drive frequencies is a minor effect when compared to the addition of the straight section 40 in front of the collision cell. It is also expected that increasing the drive frequency significantly, as for example by a factor of two or more, would produce a pseudo-potential well depth sufficient to keep the precursor ion confined radially within the collision cell. A possible disadvantage in some circumstances, however, would be a possible associated reduction in mass range, as determined by equation 3. The maximum mass range may be determined by the available voltages from the ion guide power supplies. Voltage limits are also determined by the voltages at which discharge, tracking, and/or breakdown might occur. At some point, higher voltages require different types of electrical feedthroughs, and since feedthroughs are designed and rated with maximum voltage limits, the use of higher voltages can necessitate the use of higher rated electrical feedthroughs, which can be associated with a premium price value. Consequently, passing higher voltages through the chamber walls to the ion guide can increase the cost to a commercial instrument. Simply doubling the frequency would increase the pseudo-potential well depth by a factor of four while the mass range would also be reduced by a factor of four, which could, though may not necessarily, be a potentially undesirable effect in a commercial instrument.

The applicants' teachings further include curved collision cells having straight front sections and curved sections of varying radii.

There are a significant number of variables involved in designing a curved collision cell having a front straight section in accordance with the teachings herein. These include, without limitation, collision cell pressure; initial ion kinetic energy; the collision cross-section of ion(s) of interest; the mass of the neutral collision partner (e.g, the collision gas); and the depth of the pseudo-potential well required to prevent the ion(s) of interest from colliding with an electrode (or escaping the collision cell). Moreover, the depth of the pseudo-potential well is dependent upon factors which include the field radius of the collision cell; the drive frequency of the collision cell; and the mass of the ion(s) of interest. In addition, there are physical limitations due to the size of the ion guide electrodes, or other collision cell components, the potentials applied, and the spacing between electrodes.

Fragile ions requiring only a little kinetic energy to cause dissociation (i.e., fragmentation) may be fully dissociated (i.e., fragmented) within a short distance into the Q2 collision cell, and therefore require only a minimal reduction of kinetic energy in the straight section. Accordingly, straight sections of variable effective length are contemplated. For example, as will be understood by those skilled in the relevant arts once they have been made familiar with this disclosure, RF and/or dc fields may be used in such straight (and/or curved) sections in order to maintain a desired kinetic energy when a straight section 40 has been provided that is longer than required to reduce kinetic energy to a desired point. This can prevent, for example, the necessity for using straight sections 40 of varying physical length.

Ions which are more difficult to fragment may require higher collision energies, and thus, other parameters being held equal, a configuration with a longer straight section 40 may be used to advantage. Accordingly, the applicants recognize that consideration for choosing a balance of parameters can improve both the fragmentation efficiency and the transmission of product and precursor ions through the collision cell Q2. For example, in various embodiments, applying sufficient kinetic energy to the precursor ions, by appropriate means such as by an accelerating DC field between ST2 and IQ2, can cause dissociation of difficult-to-fragment precursor ions within the straight section 40 of the collision cell Q2. The resulting product ions and any remaining precursor ions can continue to have high levels of kinetic energy while in the straight section 40. Consequently, by providing a sufficient length for the straight section 40, these ions can lose sufficient kinetic energy in order to survive transmission through the curved section 44. Further dissociation of the precursor ions (or the product ions) can occur within the curved section 44 during transmission.

While the present teachings describe fragmenting the precursor ions either in the straight or curved sections of the collision cell, in various embodiments, there can, as will be appreciated by those skilled in the relevant arts, arise situations in which it may be advantageous to allow an ion or ions to enter and exit the collision cell without dissociating. Whether generally referred to as as precursor ions, as product ions associated from a previous dissociation of precursor ions or a combination thereof, the ions enter the straight section 40 and lose a desired amount of kinetic while traversing the length of the straight section 40. In the absence of collisional dissociation, the ions can survive passage within and through the curved portion without escaping or contacting the collision cell. As discussed above, in the presence of collisional dissociation, the ions can survive passage within the curved portion without escaping or contacting the collision cell and result in fragmentation producing product ions.

Actual physical dimensions of curved sections 44 can dictate the required length of the corresponding straight sections 40 for optimal analysis of particular ion(s). The degree of curvature of curved sections 44 will also affect the calculation of lengths of sections 40. For example, an ion entering a 180 degree curved section 44 will encounter the outer electrode in a shorter distance than an equivalent ion entering a collision cell having a curved section 44 of lesser total curvature.

Other considerations can also affect design choices for curved collision cells. One purpose of curving the collision cell is to reduce the overall physical length of an instrument corresponding to a desired ion path length. Thus, from the standpoint of minimizing overall physical length of a mass analysis instrument, increasing the length of the straight section 40 to the point at which the total length of the ion path exceeds the overall length of the straight ion path can tend to defeat the purpose of curving the Q2 collision cell.

Figure 12:
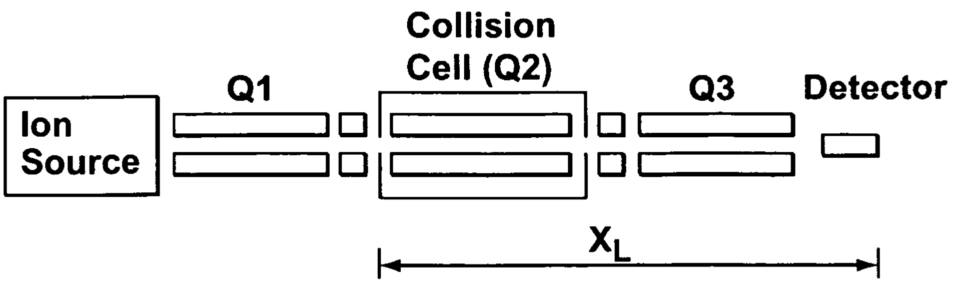
FIG. 12 is a schematic representation of a mass analyzer having a straight collision cell.

A quadrupole analyzer providing an ion path of length L will, when curved 180 degrees, form an analyzer with a radius of $L/\pi$ for a savings in physical length of approximately 0.68 L on the longest dimension of the collision cell. Curving the collision cell by 90 degrees will provide a collision cell with a radius of $2\ L/\pi$, with a resultant savings of approximately 0.36 L on the longest dimension. With regard to the overall length of the curved ion path compared to the straight ion path, there is an additional savings of the length of the optics (i.e., the Q3 quadrupole, detector, etc.) that follow the collision cell. FIG. 12 shows a typical triple quadrupole that utilizes a straight collision cell (Q2). The distance $X_L$ is the length of the collision cell plus that of the optics that follow downstream of the collision cell.

Figure 13:
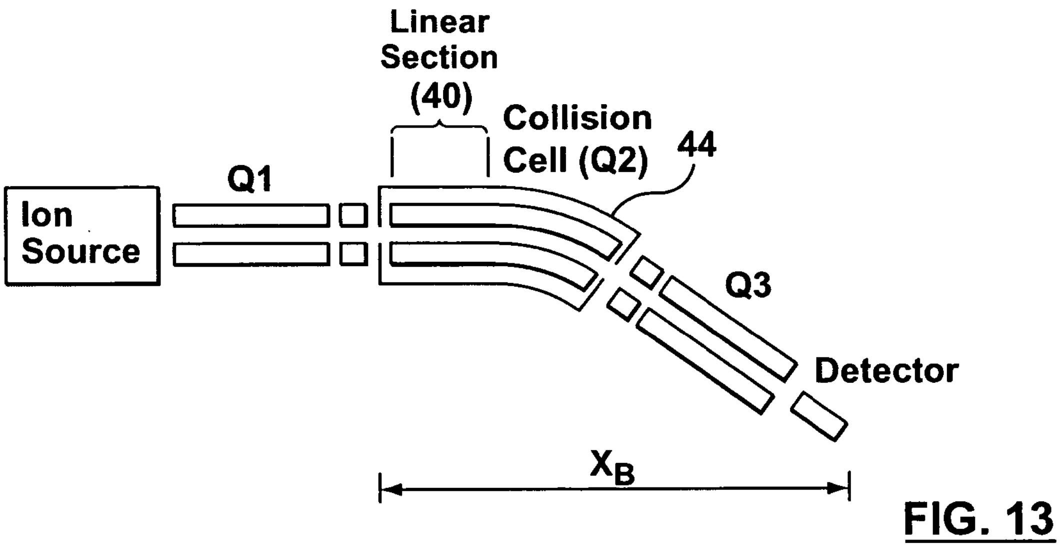
FIGS. 13-18 are schematic representations of mass analyzers having curved collision cells in accordance with applicants' teachings.
Figure 14:
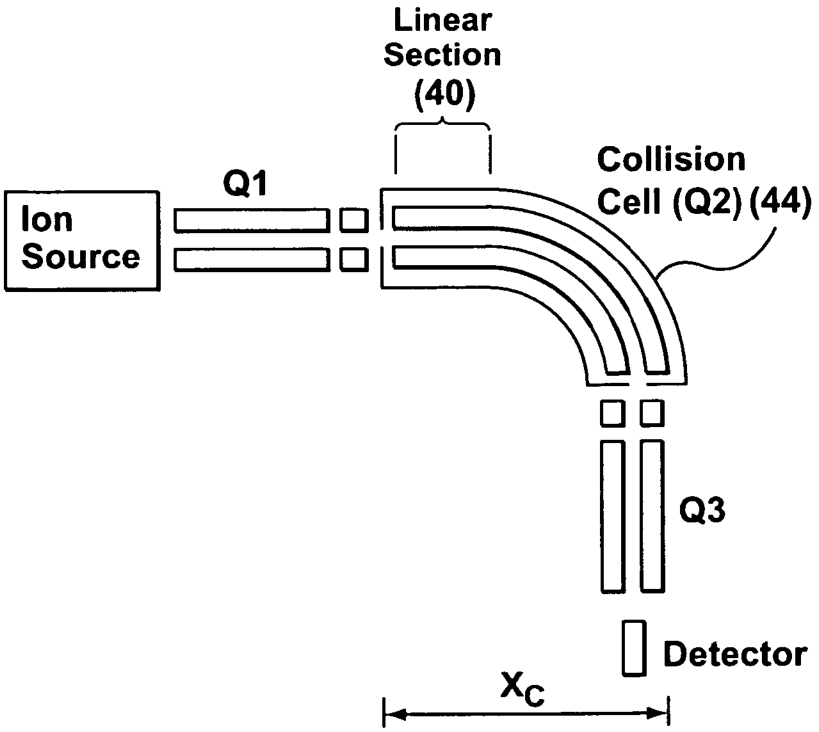
Figure 15:
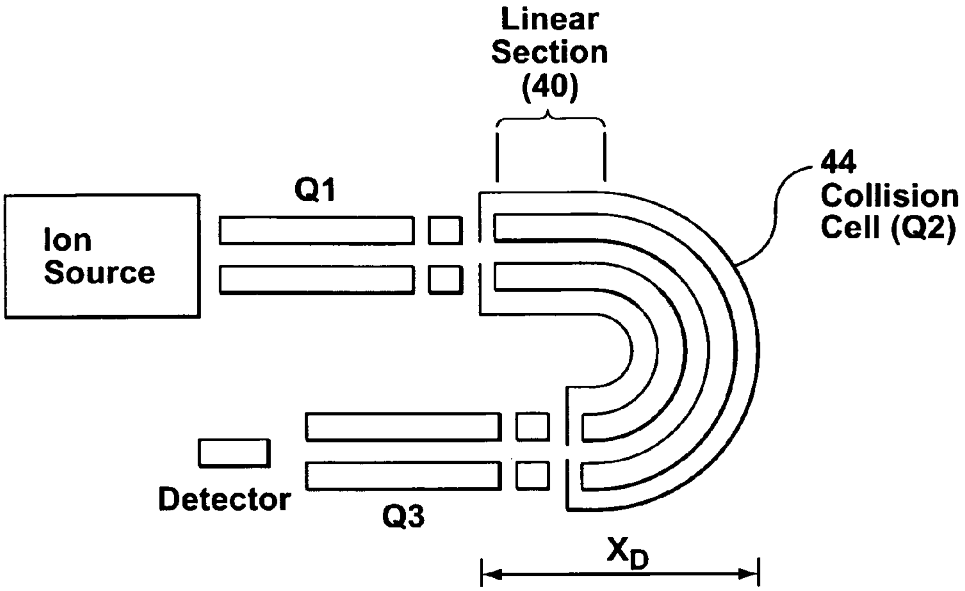
Figure 16:
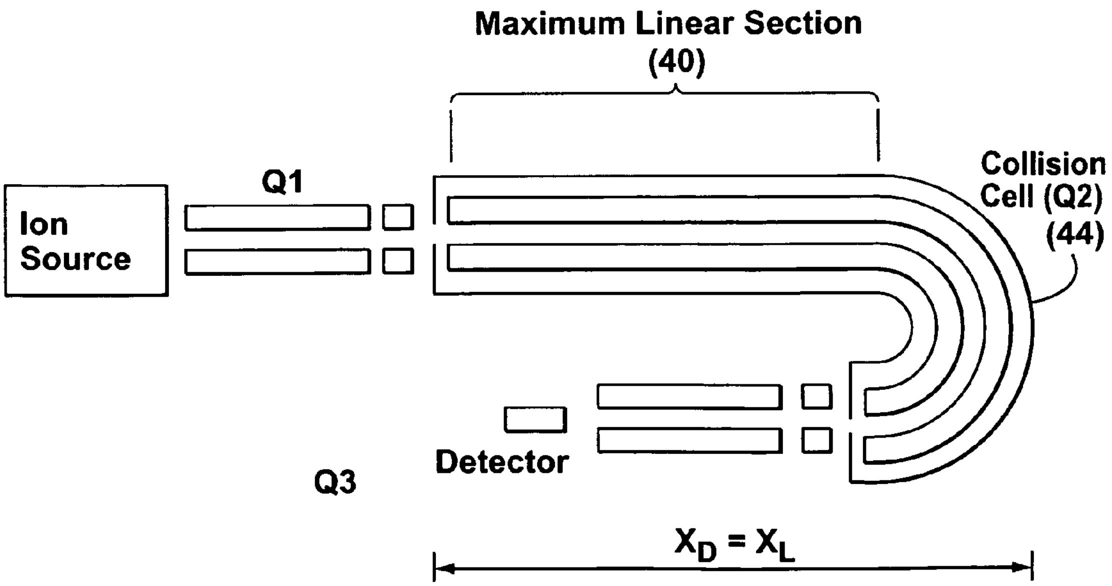

FIGS. 13 through 15 illustrate some variations of curved collision cells having straight sections 40 in front (i.e., upstream) of the curved section 44 of the collision cells. Curving the collision cells reduces the length $X_L$ to lengths $X_B$, $X_C$, $X_D$, shown in FIGS. 13-15, resulting in shorter overall lengths relative to the corresponding portion of the ion path provided in the instrument. In FIG. 13, the curve is less than 90 degrees, giving a relatively small reduction ion the overall length of the ion path along a given straight axial line. In FIG. 14, curved portion 44 comprises a curve of 90 degrees, which provides a shorter overall length than that provided by the less-curved section of FIG. 13, and a significantly shorter overall length than that of the instrument of FIG. 12 having the same total ion path length. The collision cell shown in FIG. 15, which comprises a curved section 44 curving through 180 degrees, is of even shorter overall length. In each of FIGS. 13-15 the ion path provided within the collision cells contains a short straight section, which can range from, for example, approximately 1 millimeter in common current applications to a maximum of $X_L$-$X'_U$, where $X'_u$ (U=A, B, or C) is determined by the case of a zero-length straight section. In FIG. 16, the straight section is equal to its maximum, which produces a curved ion path equal to the length of the straight ion path shown in FIG. 12. FIG. 16 shows a maximum length of straight section 40.

Figure 17A:
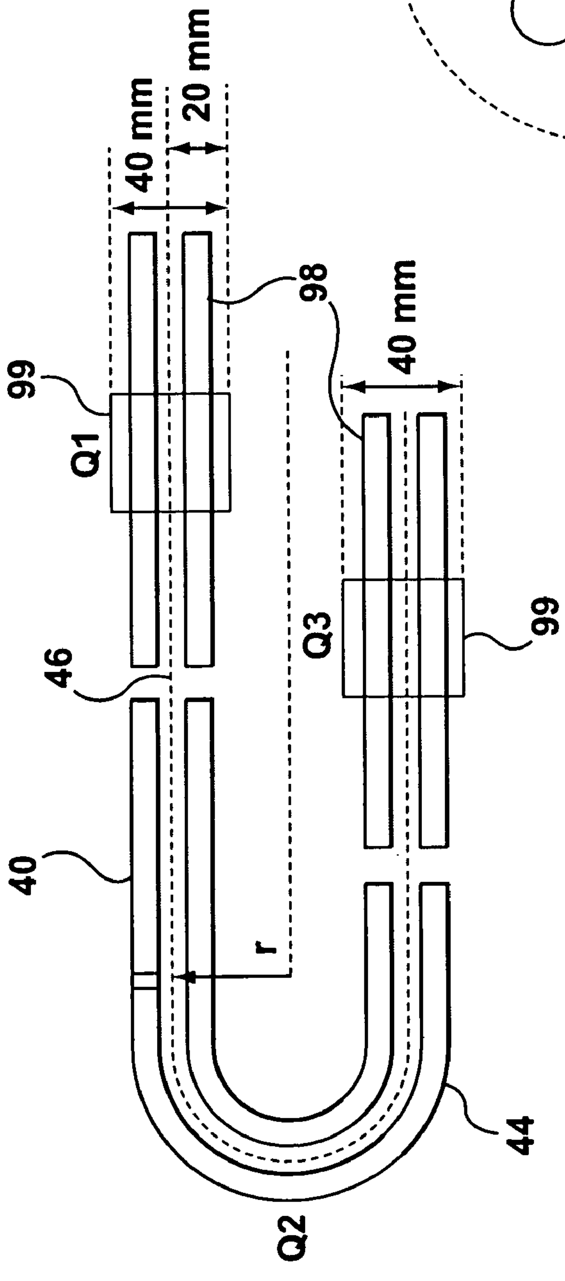
Figure 17B:
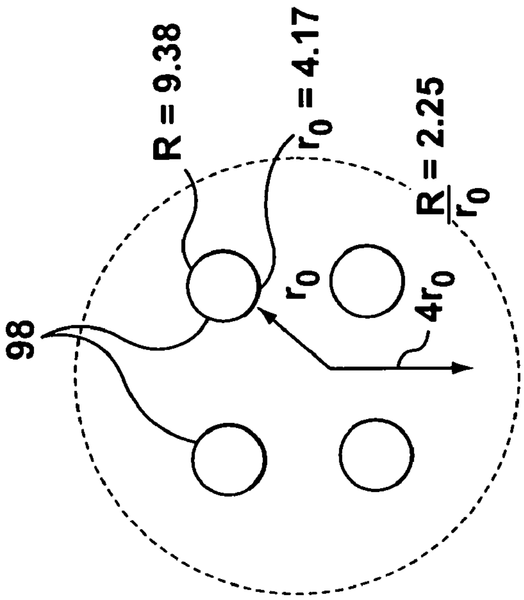

With a 180 degree curved collision cell, the minimum radius can be limited by the physical dimensions of the analyzing quadrupoles (e.g., Q1, Q3). For example, FIG. 17*a* shows a curved collision cell with a curved section 44 having a mean radius (i.e., a radius to the central axis 46 of the collision cell) of radius "r". Each electrode 98 of each analyzing quadrupoles Q1, Q3 can be contained within a corresponding support collar 99. The support collar 99 can provide structure for holding and maintaining the quadrupoles' alignment and for facilitating the electrical connections to the electrodes 98. Depending on the quadrupole dimensions, including the field radius $r_0$ (defined as the radius of the inscribed circle subtended by the analyzing quadrupoles indicated in FIG. 17*b*), and practical mechanical reasons, the inner and outer radii of the support collars can be constrained to minimum values. In the configuration shown in FIG. 17*a*, the analyzing quadrupole Q1 can be envisioned to be positioned essentially adjacent and parallel to analyzing quadrupole Q3, and in this close proximity, the combined outer radii of the support collars can be a limiting factor for determining the mean radius "r". In an exemplary embodiment, the outer diameters of each support collar can be about $9.5r_0$, and $r_0$=4.17 mm. Accordingly, if the Q1 and Q3 support collars can be aligned such that they approximately touch each other, then the minimum value for the mean radius "r" can be about 19.8 mm. Thus, the axial length of the curved collision cell is equal to $\pi r$, or 62.2 mm.

For a curved collision cell of radius r equal to 45 mm, or $45/4.17=10.79r_0$, as previously discussed, the length of the curved axis or mean ion path 46 is 141.4 mm.

Figure 18:
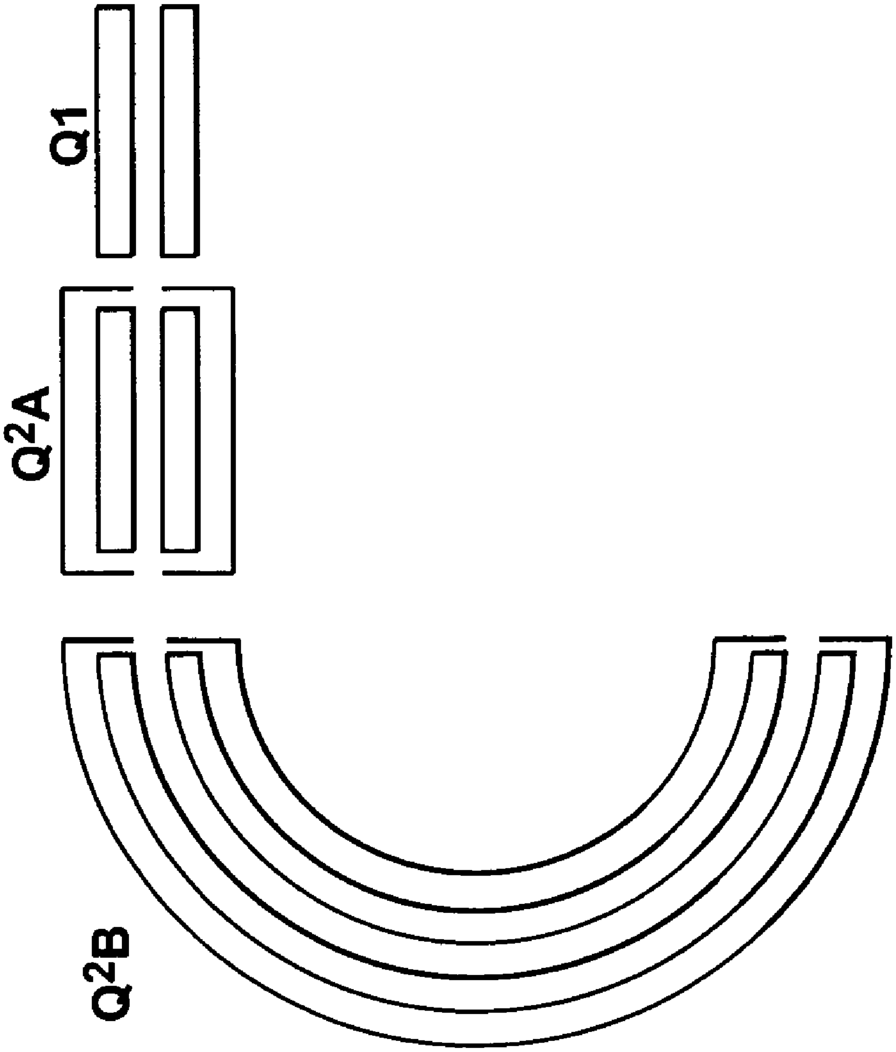

As described above, the curved section is mated or physically joined to the straight section, however, the applicants' teachings also provide embodiments in which the curved collision cell with a straight front section comprises two or more intermediate parts or section that are modular, as shown, for example, in FIG. 18. Therein, it can be seen that straight section Q2A is modular from curved section $Q^2$B, and ion guide region Q1. This provides, for example, for the possibility of interchanging the respective straight and/or the respective curved sections 40, 44 (shown in FIG. 18 as $Q^2$A and $Q^2$B, respectively), to accommodate varying analytical needs in different embodiments.

While the applicants' teachings are described in conjunction with various embodiments, it is not intended that applicants' teachings be limited to such embodiments. On the contrary, the applicants' teachings encompass a wide variety of alternatives, modifications, and equivalents, as will be appreciated by those of ordinary skill in the relevant arts.

We claim:

1. A collision cell comprising at least one electrode and also comprising:

a straight section having an inlet for receiving a precursor ion at a first end; said straight section configured to, at least one of, allow fragmentation of said precursor ion to generate product ions, allow said precursor ion to lose kinetic energy as it passes through said straight section from a first to a second end and allow said product ions to lose kinetic energy as it passes through said straight section from the first to the second end;

a curved section downstream of the second end of the straight section; the curved section configured to allow fragmentation of said precursor ion and to generate product ions therefrom;

wherein the straight section is about twenty-five millimeters to four centimeters in length, and the curved section has a mean radius of curvature of about forty-five millimeters to about fifty millimeters along its longitudinal axis.

2. The collision cell of claim 1 wherein said collision cell comprises a quadrupole set.

3. The collision cell of claim 1 wherein the straight section and the curved section are mated.

4. The collision cell of claim 1 wherein an intermediate section is disposed between the straight section and the curved section.

5. A method of fabricating a collision cell comprising:

selecting a precursor ion;

determining parameters of a curved section for said collision cell including a desired radius, axial distance, number and configuration of electrodes, operating pressure, and operating frequency in order to generate product ions from said precursor ions;

determining a first level of kinetic energy that would cause said precursor ion to crash into one of said electrodes when said precursor ion is introduced into said collision cell at said first level;

determining a second level of kinetic energy that would cause said precursor ion to survive passage through said curved section when said precursor ion is introduced into said collision cell at said second level;

selecting a length for a straight section of the collision cell to be connected to said curved section; said length being based on a span needed to allow said precursor ion to lose a third level of kinetic energy being substantially equal to a difference between said first level and said second level during travel along said span;

wherein said number and configuration of electrodes are selected to provide a collision cell comprising at least one quadrupole set; and wherein said straight section is about twenty five millimeters to about four centimeters in length and wherein said curved portion has a mean radius of curvature of about forty-five millimeters to about fifty millimeters along its longitudinal axis.

6. The method of claim 5 further comprising the steps of: constructing said collision cell with:

said straight section having said length and an inlet for receiving said precursor ion; said straight section for allowing said precursor ion to lose kinetic energy as it passes through said straight section;

a curved section merging at a first end of said curved section with said straight portion and an end of said straight section opposite from said inlet; said curved section for allowing collisions of said precursor ion to generate said product ions therefrom.

7. The method of claim 5 wherein said step of determining said first level of kinetic energy is based on a model for calculating the amount of kinetic energy of said precursor ion as a function of said axial distance and said pressure.

8. The method of claim 5 wherein said step of determining said second level is based on determining an amount of energy needed to confine within said precursor ion within said curved section, whereby said precursor ion's kinetic energy perpendicular to an axis of said curved section is less than a pseudo-potential well depth of said electrodes.

9. A collision cell for a mass spectrometer comprising a curved section and a straight section joined at an entrance to said curved portion; said straight section having a length that is about twenty-five millimeters to four centimeters to cause an ion entering the straight section to lose a desired amount of kinetic energy such that when said ion enters said curved section said ion will neither escape nor contact the collision cell, and thereby survive passage within said curved portion, wherein said curved section has a mean radius of curvature of about forty-five millimeters to about fifty millimeters along its longitudinal axis.

10. A mass spectrometer comprising at least two of quadrupole regions interconnected by a collision cell comprising a curved section and a straight section connected at an entrance to said curved section; said straight section having a length that is about twenty-five millimeters to four centimeters to cause an ion entering the straight section to lose a desired amount of kinetic energy such that when said ion enters said curved section said ion will neither escape nor contact the collision cell, and thereby survive passage within said curved portion, wherein said curved section has a mean radius of curvature of about forty-five millimeters to about fifty millimeters along its longitudinal axis.

* * * * *